March 6, 1956 C. A. WYNDHAM 2,737,276
POWER TRANSMITTING DEVICE
Filed May 7, 1952 2 Sheets-Sheet 1

Charles A. Wyndham
INVENTOR.

BY
Attorneys

March 6, 1956  C. A. WYNDHAM  2,737,276
POWER TRANSMITTING DEVICE
Filed May 7, 1952  2 Sheets-Sheet 2

Charles A. Wyndham
INVENTOR.

BY *[signatures]*
Attorneys

United States Patent Office 2,737,276
Patented Mar. 6, 1956

2,737,276

POWER TRANSMITTING DEVICE

Charles A. Wyndham, Bellingham, Wash.

Application May 7, 1952, Serial No. 286,559

6 Claims. (Cl. 192—58)

This invention relates to new and useful improvements in power converters and braking units and the primary object of the present invention is to provide a novel and improved braking means for shafts that are directly or indirectly driven.

Another important object of the present invention is to provide a reversible transmission for boats or other equipment involving direct and reversible type drive shafts and means for selecting the type whereby a propellor shaft may be rotated either clockwise or counter-clockwise.

A further object of the present invention is to provide a hydraulic brake including a housing having stationary blades therein, a power driven shaft extending through the housing and having driving blades thereon spaced radially from the stationary blades, and a sleeve member slidable on the shaft for selectively covering and uncovering the driving blades, the liquid in the housing being engaged against the stationary blades when the driving blades are uncovered to brake rotation of the shaft.

A still further aim of the present invention is to provide a braking means for shafts that are directly or indirectly driven and which brake means is simple and practical in construction, strong and reliable in use; small and compact in structure; one that involves relatively few working parts that are quickly and readily assembled, disassembled for service in a convenient manner; and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
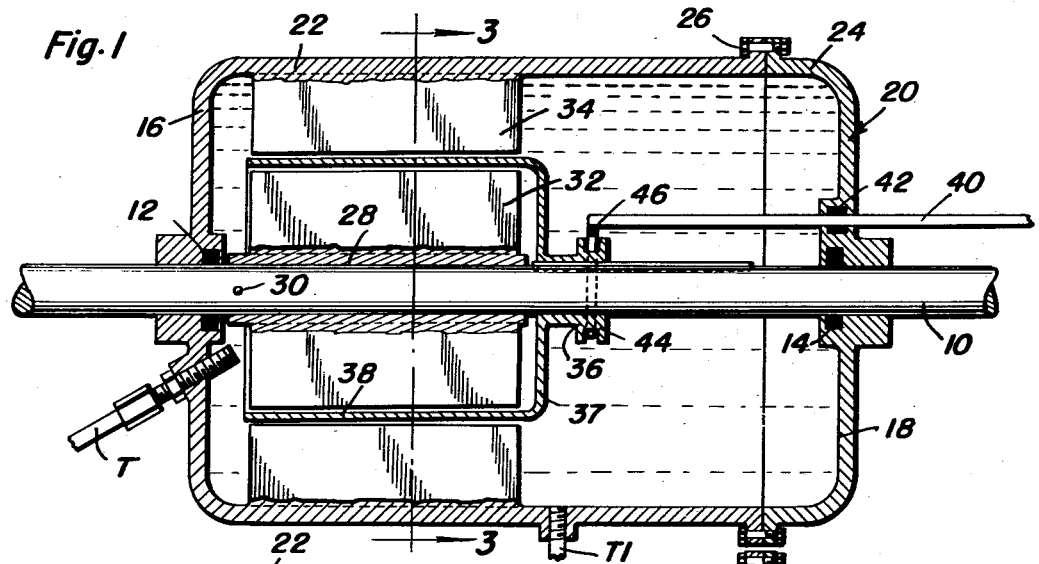
Figure 1 is a longitudinal sectional view of the present invention and showing the brake sleeve in its non-braking position.

Referring now to the drawings in detail, wherein for the purpose of illustration, there is disclosed a preferred embodiment of the present invention, the numeral 10 represents a power driven shaft that extends through oil tight bearings 12 and 14 on the end walls 16 and 18 of a housing member 20. Housing member 20 is composed of two sections 22 and 24 that are removably secured together by fasteners 26, whereby a liquid, such as oil may be placed in the housing member and so that a sleeve 28 may be applied over or removed from shaft 10.

Figure 3:
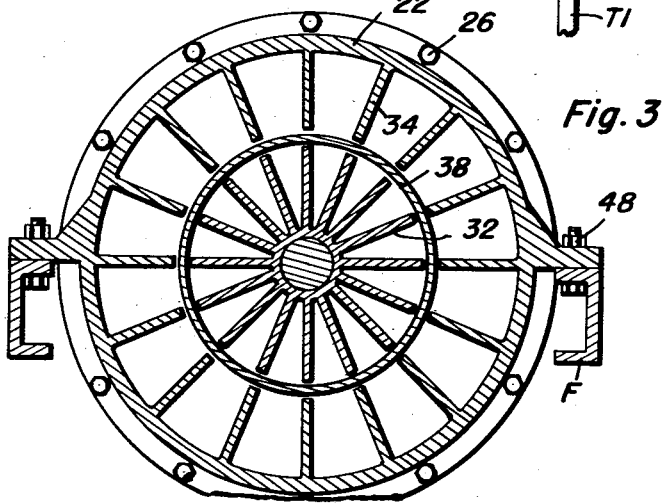
Figure 3 is a transverse vertical sectional view taken substantially on the plane of section line 3—3 of Figure 1.

Sleeve 28 is removably secured on the shaft 10 by a fastener or pin 30. A plurality of elongated driving fins or blades 32 are fixed to and project radially outwardly from the sleeve 28 and face a series of circumferentially spaced radially disposed stationary blades or fins 34 on the inner periphery of the cylindrical housing-forming section 22, as shown in Figure 3.

A collar 36, slidably keyed on the shaft 10, is formed centrally of a plate 37 at the end of a cylindrical wall or sleeve 38. An actuating rod 40 slidably received in an oil tight bearing 42 carried by end wall 18 is coupled to a peripherial channel 44 on collar 36 by a fork element 46.

Figure 2:
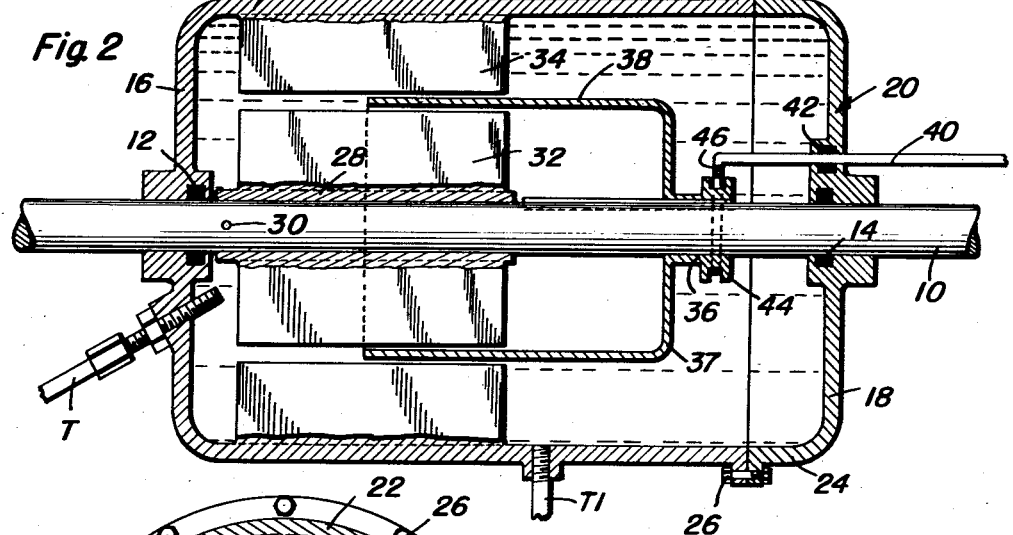
Figure 2 is a view similar to Figure 1 but showing the brake sleeve in its partial brake applying position.

In practical use of the present invention, sleeve 38 is normally located between the blades 32 and 34, to enclose the blades 32, as shown in Figure 1, and permit rotation of the shaft 10 by power means. When the sleeve 38 is pulled toward end wall 18, as shown in Figure 2, the oil directed about by the blades 32 will impinge against blades 34, and as housing member 22 is secured to a stationary support or frame F, as at 48, the shaft 10 will meet considerable resistance and rotation of the shaft 10 will be arrested.

Housing member 10 is operatively connected to a cooling system return tube T and to a cooling system outlet tube T1 of an oil cooler (not shown).

Figure 4:
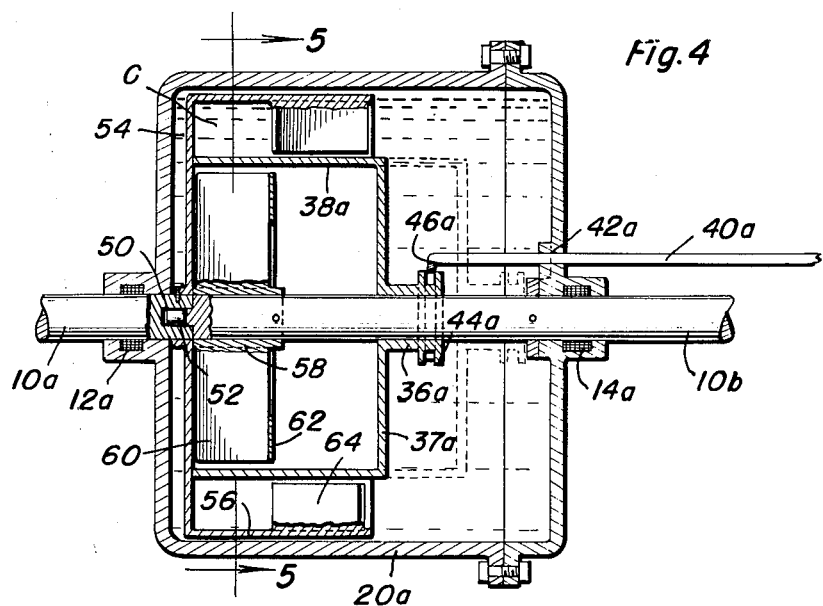
Figure 4 is a longitudinal vertical sectional view of the invention in conjunction with a reversely driven shaft.
Figure 5:
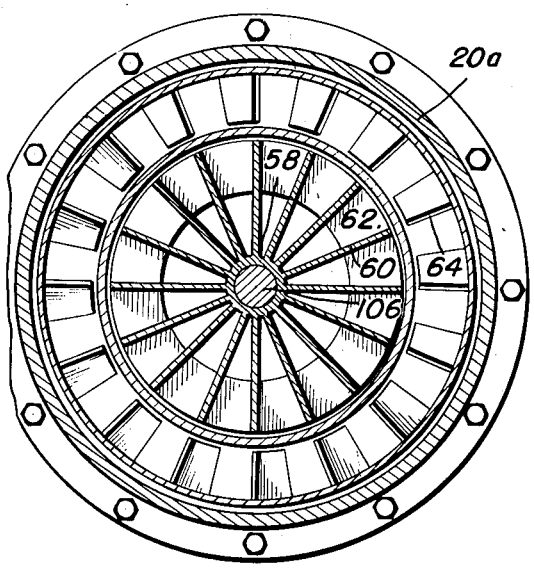
Figure 5 is a transverse vertical sectional view taken substantially on the plane of section line 5—5 of Figure 4; and, Figure 6 is an enlarged fragmentary view of the driving vane member shown in Figures 4 and 5.

Reference is now directed to Figures 4 and 5 wherein the two part housing member 20a is provided with end bearings 12a and 14a that rotatably receive the adjacent ends of a driven shaft 10a and a drive shaft 10b. The inner end of shaft 10a is provided with a socket 50 that receives the reduced end 52 of shaft 10b.

A first plate 54 has a central hub portion fixed to the shaft 10a and fixedly supports a cylindrical wall 56 that is disposed concentric with the shafts 10a and 10b.

The inner end of shaft 10b removably supports a sleeve 58 having a plurality of circumferentially spaced radially disposed blades or fins 60 that are connected by a ring element 62.

A sleeve or collar 36a slidably and rotatably received on the shaft 10b is centrally fixed to a plate 37a supporting a sleeve or cylindrical wall 38a. An actuating rod 40a slidably carried by a bearing 42a on the member 20a is coupled by a fork 46a to a peripheral channel 44a on the collar 36a.

The inner periphery of the end of wall 56 remote from plate 54 is formed with a plurality of circumferentially spaced inclined blades or fins 64 that terminate short of plate 54 to provide a chamber C to relieve the turbulence tending to force blades 64 in the same direction as the blades 60 are rotating with shaft 10b.

Figure 6:
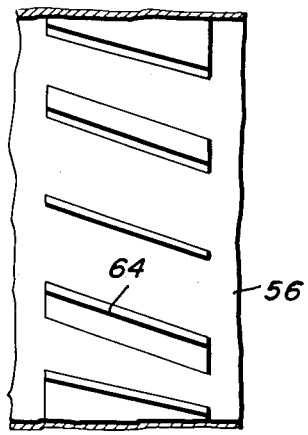

In use of the device shown in Figures 4, 5 and 6, with sleeve 38a in its dotted line position shown in Figure 4, shaft 10b is power driven and blades 60 turbulate the oil in member 20a, which oil impinges against blades 64 and due to the angle of the blades 64, wall 56 and shaft 10a will be rotated opposite to the direction the shaft 10b is rotating. As the sleeve 38a is moved across the blades 64 and 60 to enclose the blades 60, rotation of shaft 10a by the shaft 10b is discontinued.

Having described the invention what is claimed as new is:

1. A power transmitting device comprising a housing member filled with a liquid, a pair of coaxial shafts having adjacent ends extending into the housing member, one of said shafts constituting a driven shaft and the other of said shafts constituting a drive shaft, a first plate centrally fixed to the drive shaft and disposed in the housing member, a second plate slidably supported on the driven shaft, a first cylinder fixed to the first plate and extending toward the second plate, a second cylinder fixed to the second plate, said cylinders being concentric with each other and with said shafts, a plurality of radially disposed fins attached to the driven shaft and located between the plates radially inwardly from both cylinders and disposed within the first cylinder, a plurality of circumferentially spaced fins on the inner periphery of the first cylinder and disposed radially outwardly from the second cylinder, whereby the second cylinder may enter the first cylinder to extend past the first named fins, and means connected to the second plate for selectively moving the second cylinder into and out of the first cylinder.

2. A power transmitting device comprising a housing member filled with a liquid, a pair of coaxial shafts having adjacent ends extending into the housing member, one of said shafts constituting a driven shaft and the other of said shafts constituting a drive shaft, a first plate centrally fixed to the drive shaft and disposed in the housing member, a second plate slidably supported on the driven shaft, a first cylinder fixed to the first plate and extending toward the second plate, a second cylinder fixed to the second plate, said cylinders being concentric with each other and with said shafts, a plurality of radially disposed fins attached to the driven shaft and located between the plates radially inwardly from both cylinders and disposed within the first cylinder, a plurality of circumferentially spaced fins on the inner periphery of the first cylinder and disposed radially outwardly from the second cylinder, whereby the second cylinder may enter the first cylinder to extend past the first named fins, and means connected to the second plate for selectively moving the second cylinder into and out of the first cylinder, said second cylindrical wall being longer than said first cylindrical wall, whereby said second cylindrical wall may be moved relatively close to the first plate.

3. A power transmitting device comprising a housing member filled with a liquid, a pair of coaxial shafts having adjacent ends extending into the housing member, one of said shafts constituting a driven shaft and the other of said shafts constituting a drive shaft, a first plate centrally fixed to the drive shaft and disposed in the housing member, a second plate slidably supported on the driven shaft, a first cylinder fixed to the first plate and extending toward the second plate, a second cylinder fixed to the second plate, said cylinders being concentric with each other and with said shafts, a plurality of radially disposed fins attached to the driven shaft and located between the plates radially inwardly from both cylinders and disposed within the first cylinder, a plurality of circumferentially spaced fins on the inner periphery of the first cylinder and disposed radially outwardly from the second cylinder, whereby the second cylinder may enter the first cylinder to extend past the first named fins, and means connected to the second plate for selectively moving the second cylinder into and out of the first cylinder, the fins on the inner periphery of said second cylinder fixed to the inner periphery of said second cylinder and inclined relative to the axis of the shafts.

4. A power transmitting device comprising a power driven shaft, a cylindrical housing member through which said shaft extends, said housing member being filled with a liquid, a plurality of circumferentially spaced radially disposed fins fixed to said shaft and disposed in said housing member, said housing member including a cylindrical wall, a plurality of circumferentially spaced radial disposed stationary fins fixed to the inner periphery of said cylindrical wall, said stationary fins being spaced radially outwardly from the other fins, a plate slidable on the shaft and located within the housing member, a cylindrical wall fixed to the plate and concentric with the shaft and located radially inwardly of the stationary fins and radially outwardly of the first named fins, and means connected to said plate for moving the plate to extend the cylindrical wall across and between both of said plurality of fins and to enclose the first named fins thereby permitting rotation of the shaft.

5. A power transmitting device comprising a housing member filled with a liquid, a pair of coaxial shafts having adjacent ends extending into the housing member, one of said shafts constituting a driven shaft and the other of said shafts constituting a drive shaft, a first plate centrally fixed to the drive shaft and disposed in the housing member, a second plate slidably supported on the driven shaft, a first cylinder fixed to the first plate and extending toward the second plate, a second cylinder fixed to the second plate, said cylinders being concentric with each other and with said shafts, a plurality of radially disposed fins attached to the driven shaft and located between the plates radially inwardly from both cylinders and disposed within the first cylinder, a plurality of circumferentially spaced fins on the inner periphery of the first cylinder and disposed radially outwardly from the second cylinder, whereby the second cylinder may enter the first cylinder to extend past the first named fins, and means connected to the second plate for selectively moving the second cylinder into and out of the first cylinder, said first named fins being inclined relative to the axes of the shafts and parallel to each other to permit rotation of the driven shaft opposite to the drive shaft.

6. A power transmitting device comprising a power driven shaft, a cylindrical housing member into which said shaft extends, said housing being filled with a liquid, a plurality of circumferentially spaced radially disposed first fins fixed to said shaft and disposed in said housing, a plurality of circumferentially spaced medially disposed second fins supported in said housing, said second fins being circumferentially disposed relative to the outer periphery of said first radially disposed fins, a plate slidable on the shaft and located within the housing member, a cylindrical wall fixed to the plate and concentric with the shaft, said cylindrical wall being located radially inwardly of the second fins and radially outwardly of the first fins and reciprocable longitudinally therebetween, and means connected to said plate for moving the plate to extend the cylindrical wall across and between both of said first and second fins and to enclose the first fins therein.

References Cited in the file of this patent

UNITED STATES PATENTS

| | | |
|---|---|---|
| 2,096,071 | Sinclair | Oct. 19, 1937 |
| 2,258,302 | Ronning | Oct. 7, 1941 |
| 2,280,897 | Denman | Apr. 28, 1942 |